United States Patent
Takushima et al.

(10) Patent No.: US 7,277,607 B2
(45) Date of Patent: Oct. 2, 2007

(54) OPTICAL MULTIPLEXER/DEMULTIPLEXER, OPTICAL DEVICE, AND OPTICAL TRANSMISSION SYSTEM

(75) Inventors: Michiko Takushima, Yokohama (JP); Tomomi Sano, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 118 days.

(21) Appl. No.: 11/101,634

(22) Filed: Apr. 8, 2005

(65) Prior Publication Data
US 2005/0238284 A1 Oct. 27, 2005

Related U.S. Application Data

(60) Provisional application No. 60/563,466, filed on Apr. 20, 2004.

(30) Foreign Application Priority Data
Apr. 19, 2004 (JP) ............... P2004-122762

(51) Int. Cl.
*G02B 6/26* (2006.01)
(52) U.S. Cl. .................. 385/24; 385/18
(58) Field of Classification Search .......... None
See application file for complete search history.

(56) References Cited

U.S. PATENT DOCUMENTS

| 6,320,996 B1* | 11/2001 | Scobey et al. | 385/18 |
| 6,535,311 B1* | 3/2003 | Lindquist | 398/82 |
| 6,636,654 B2* | 10/2003 | McGuire | 385/17 |
| 6,661,948 B2 | 12/2003 | Wilde | |
| 6,941,073 B2* | 9/2005 | McGuire | 398/84 |
| 2004/0190815 A1* | 9/2004 | Sano et al. | 385/16 |

* cited by examiner

*Primary Examiner*—Rodney Bovernick
*Assistant Examiner*—Mike Stahl
(74) *Attorney, Agent, or Firm*—McDermott Will & Emery LLP

(57) ABSTRACT

An optical system 111 collimates wavelength components of wavelengths $\lambda 1$-$\lambda 3$ emerging from an end face of optical fiber 11, a diffraction grating 121 separates them by wavelength, and an optical system 112 condenses them. The component of the wavelength $\lambda 1$ is focused at a focus position by the optical system 112 and diverges after the focus position. Then the component of the wavelength $\lambda 1$ is collimated by an optical system 113, travels via a diffraction grating 122, and is condensed by an optical system 114 to enter an end face of optical fiber 22. The component of the wavelengths $\lambda 2$, $\lambda 3$ condensed by the optical system 112 are reflected by reflecting portions 132, 133 set at their respective focus positions, are collimated by the optical system 112, travel via the diffraction grating 121, and are condensed by the optical system 111 to enter an end face of optical fiber.

8 Claims, 11 Drawing Sheets

US 7,277,607 B2

OPTICAL MULTIPLEXER/DEMULTIPLEXER, OPTICAL DEVICE, AND OPTICAL TRANSMISSION SYSTEM

CROSS-REFERENCE TO RELATED APPLICATION

This application claims priority to Provisional Application Ser. No. 60/563,466 filed on Apr. 20, 2004 which is hereby incorporated by reference in their entirety.

BACKGROUND OF THE INVENTION

1. Field of the Invention

The present invention relates to an optical multiplexer/demultiplexer for multiplexing or demultiplexing optical signals in a WDM optical communication system or the like.

2. Related Background of the Invention

A Wavelength Division Multiplexing (WDM) optical communication system for transmitting multi-wavelength optical signals through an optical transmission path by multiplexing uses an optical multiplexer/demultiplexer for multiplexing or demultiplexing multi-wavelength optical signals. The optical multiplexer/demultiplexer disclosed in U.S. Pat. No. 6,661,948 permits selection of an input or output port for respective wavelength components, and is suitably used in an optical communication network in which transmission paths of optical signals and wavelengths of optical signals are flexibly determined.

The optical multiplexer/demultiplexer disclosed in U.S. Pat. No. 6,661,948 has a wavelength separator for spatially separating an optical signal fed through an input port into respective wavelength components, and rotatable mirrors for optionally selecting an output port for each of the wavelength components separated by the wavelength separator. Namely, an output port from which a wavelength component is outputted is determined by an angle of rotation of each rotatable mirror.

SUMMARY OF THE INVENTION

However, the optical multiplexer/demultiplexer disclosed in U.S. Pat. No. 6,661,948 requires precise control on the angle of rotation of each rotatable mirror, in order to output a wavelength component from a selected output port The present invention has been accomplished in order to solve the above problem and an object of the invention is to provide an optical multiplexer/demultiplexer capable of readily and precisely selecting an input/output port.

An optical multiplexer/demultiplexer according to the present invention is an optical multiplexer/demultiplexer for receiving light through any port out of a plurality of ports and for outputting respective wavelength components included in the light, from any port out of the plurality of ports, the optical multiplexer/demultiplexer comprising: (1) a first optical system for, with input of an optical signal through any one of a first group of ports among the plurality of ports, outputting the optical signal; (2) a first wavelength separator for receiving the optical signal outputted from the first optical system, for spatially separating the optical signal into respective, wavelength components, and for outputting the respective wavelength components thus separated, into mutually different paths; (3) a second optical system for condensing the wavelength components outputted from the first wavelength separator, (4) a reflecting portion having a first reflecting surface capable of facing the second optical system, freely set at and off focus positions of the wavelength components condensed by the second optical system, and, when being set at the focus positions, reflecting the wavelength components incident from the second optical system onto the first reflecting surface, toward the second optical system to output the wavelength component from any one of the first group of ports; (5) a third optical system for receiving the wavelength components condensed by the second optical system and then diverging via the focus positions with the reflecting portion being set off the focus positions, and for outputting the wavelength components; (6) a second wavelength separator for receiving the wavelength components outputted from the third optical system and for outputting the wavelength components into paths along an identical direction; and (7) a fourth optical system for receiving the wavelength components outputted from the second wavelength separator and for outputting the wavelength components from any one of a second group of ports among the plurality of ports. In this optical multiplexer/demultiplexer, preferably, both or either of the first wavelength separator and the second wavelength separator comprises a diffraction grating.

In this optical multiplexer/demultiplexer, an optical signal entering any one of the first group of ports out of the plurality of ports is outputted by the first optical system, and the first wavelength separator spatially separates the optical signal into respective wavelength components. Then the wavelength components travel in mutually different paths to be condensed by the second optical system. When the reflecting portion is set at the focus positions of the wavelength components condensed by the second optical system, the first reflecting surface of the reflecting portion reflects the wavelength components condensed by the second optical system, toward the second optical system, and the wavelength components travel via the second optical system the first wavelength separator, and the first optical system to be outputted from any one of the first group of ports. On the other hand, when the reflecting portion is set off the focus positions of the wavelength components condensed by the second optical system, the wavelength components condensed by the second optical system are outputted by the optical system, without being reflected by the reflecting portion, and the wavelength components are subjected to multiplexing by the second wavelength separator, condensed by the fourth optical system, and outputted from any one of the second group of ports among the plurality of ports.

In this optical multiplexer/demultiplexer, preferably, the reflecting portion has a second reflecting surface capable of facing the third optical system and, when being set at the focus positions, the reflecting portion reflects light incident from the third optical system onto the second reflecting surface, toward the third optical system to output the wavelength component from any one of the second group of ports. In this case, when an optical signal entering any one of the second group of ports is reflected by the second reflecting surface of the reflecting portion, it can be outputted from any one of the second group of ports.

This optical multiplexer/demultiplexer is preferably configured in a configuration further comprising a transmitting portion adjacent to the reflecting portion, wherein the transmitting portion is set at the focus positions when the reflecting portion is set off the focus positions, and wherein a distance between the first reflecting surface and the second reflecting surface of the reflecting portion in an optical-axis direction of each of the second optical system and the third optical system is smaller than a thickness of the transmitting portion in the optical-axis direction. Preferably, the first or second reflecting surface is a reflecting film formed on a part of one surface of a transparent member, and the transmitting portion is a portion without the reflecting film in the transparent member. Preferably, a thickness of the reflecting film is not more than 0.5 μm.

In this optical multiplexer/demultiplexer, the first reflecting surface of the reflecting portion preferably has a plurality of partial reflection portions, and the second reflecting surface of the reflecting portion preferably has a plurality of partial reflection portions.

An optical device according to the present invention comprises (1) the optical multiplexer/demultiplexer according to the present invention, as described above; (2) a first optical power separator and a first wavelength tunable filter connected to any one of the first group of ports of the optical multiplexer/demultiplexer, and (3) a second optical power separator and a second wavelength tunable filter connected to any one of the second group of ports of the optical multiplexer/demultiplexer. An optical transmission system according to the present invention comprises the optical device according to the present invention, as described above, and is characterized by transmitting a multi-wavelength optical signal and processing the multi-wavelength optical signal by means of the optical device.

Another optical multiplexer/demultiplexer according to the present invention is an optical multiplexer/demultiplexer for receiving light through any port out of a plurality of ports and for outputting respective wavelength components included in the light, from any port out of the plurality of ports, the optical multiplexer/demultiplexer comprising: (1) a first optical system for, with input of an optical signal through any one of the plurality of ports, outputting the optical signal; (2) a wavelength separator for receiving the optical signal outputted from the first optical system, spatially separating the optical signal into respective wavelength components, and outputting the wavelength components thus separated, into mutually different paths; (3) a second optical system for condensing the wavelength components outputted from the wavelength separator, and (4) a reflecting portion disposed at focus positions of the wavelength components condensed by the second optical system, having a plurality of partial reflection portions, and reflecting the wavelength components incident on any one of these partial reflection portions, toward the second optical system to output the wavelength components from any one of the plurality of ports. Preferably, the wavelength separator comprises a diffraction grating.

In this optical multiplexer/demultiplexer, an optical signal entering any one of the plurality of ports is outputted by the first optical system, and the wavelength separator spatially separates the optical signal into respective wavelengths components. The wavelengths components travel through mutually different paths to be condensed by the second optical system. The wavelengths components condensed by the second optical system are reflected by any partial reflection portion of the reflecting portion placed at the focus positions, toward the second optical system, and travel via the second optical system, the first wavelength separator, and the first optical system to be outputted from any one of the plurality of ports.

DESCRIPTION OF THE PREFERRED EMBODIMENTS

The best mode for carrying out the present invention will be described below in detail with reference to the accompanying drawings. The same or like elements will be denoted by the same reference symbols in the description of the drawings, without redundant description. In each drawing xyz(xy'z',xy"z") orthogonal coordinate systems are adopted for convenience' sake of description.

First Embodiment

Figure 1:
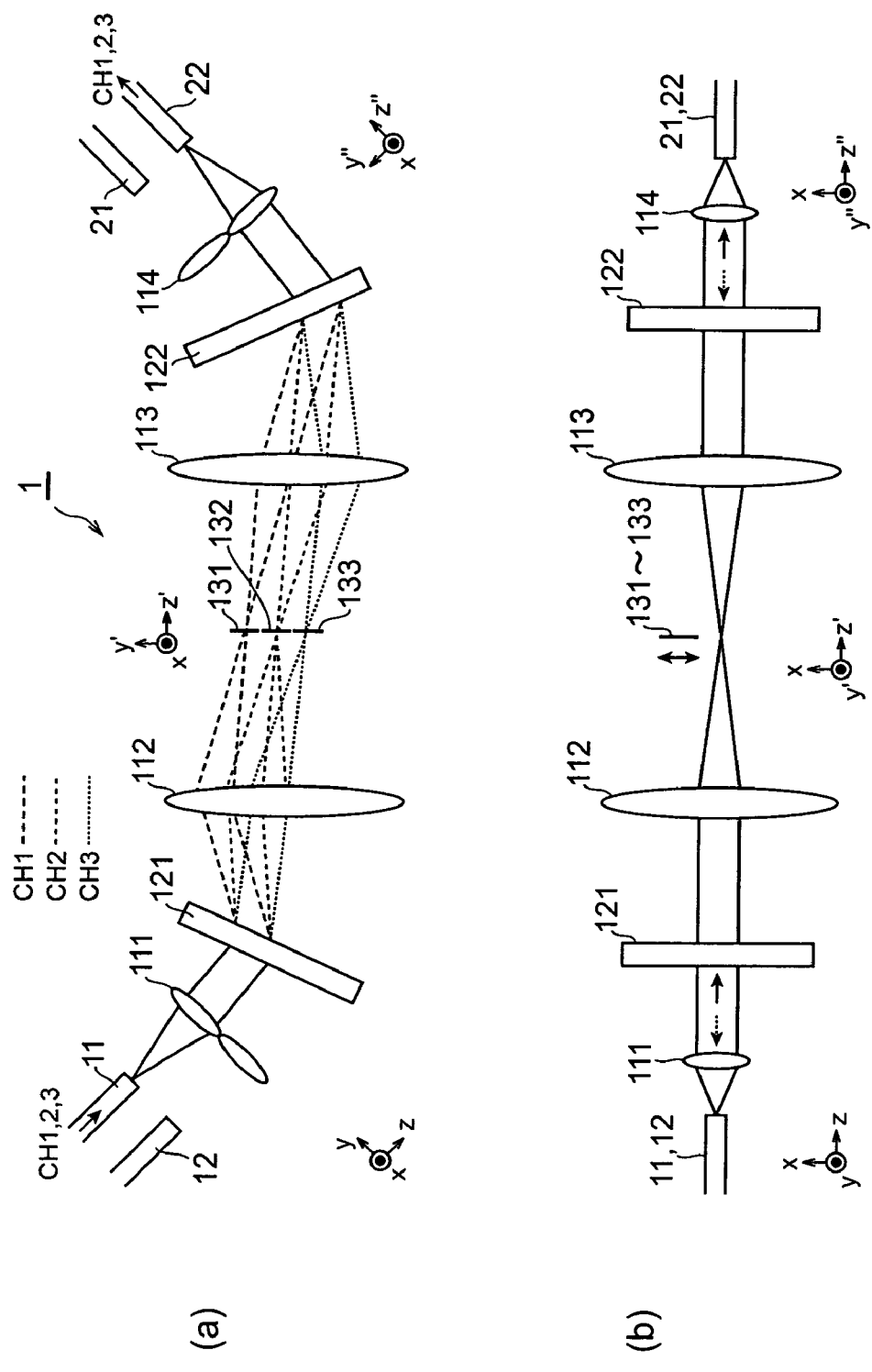
FIG. 1 is a configuration diagram of optical multiplexer/demultiplexer 1 according to the first embodiment

First he first embodiment of the optical multiplexer/demultiplexer according to the present invention will be described. FIG. 1 is a configuration diagram of optical multiplexer/demultiplexer 1 according to the first embodiment The optical multiplexer/demultiplexer 1 shown in this figure has an optical system 111, a diffraction grating 121, an optical system 112, reflecting portions 131-133, an optical system 113, a diffraction grating 122, and an optical system 114 between optical fibers 11, 12 and optical fibers 21, 22. This optical multiplexer/demultiplexer 1 has input/output ports at positions of end faces of the respective optical fibers 11, 12, 21, and 22, receives an optical signal through any one port out of these four ports, and outputs respective wavelength components included in the optical signal, from any one of the four ports.

An xyz orthogonal coordinate system is defined between optical fibers 11, 12 and diffraction grating 121, while the z-axis is set in parallel to the optical axis of optical system 111. An xy'z' orthogonal coordinate system is defined between diffraction grating 121 and diffraction grating 122, while the z'-axis is set in parallel to the optical axis of each of the optical systems 112, 113. An xy"z" orthogonal coordinate system is defined between diffraction grating 122 and optical fibers 21, 22, while the z"-axis is set in parallel to the optical axis of the optical system 114. Grating lines in each of the diffraction grating 121 and the diffraction grating 122 extend in the same direction and the x-axis is set in parallel with the direction of the grating lines.

FIG. 1(a) is a projection onto the yz(y'z',y"z") plane. FIG. 1(b) is a projection onto the xz plane between optical fibers 11, 12 and diffraction grating 121, projection onto the xz' plane between diffraction grating 121 and diffraction grating 122, and projection onto the xz" plane between diffraction grating 122 and optical fibers 21, 22.

The optical fibers 11, 12 are juxtaposed in parallel on a common plane parallel to the yz plane. The optical fibers 21, 22 are juxtaposed in parallel on a common plane parallel to the y"z" plane.

When an optical signal emerges from an end face of either of the optical fibers 11, 12, the optical system 111 receives and collimates the optical signal to output the collimated signal. The collimated signal outputted from the optical system 111 at this time travels in parallel to the z-axis direction.

The diffraction grating 121 acts as a wavelength separator, which receives the optical signal collimated by the optical system 111, spatially separates the optical signal into respective wavelength components (three wavelengths $\lambda 1$-$\lambda 3$ in the present embodiment), and outputs the wavelength components thus sepal into mutually different paths. The grating lines of this diffraction grating 121 extend in the x-axis direction, and the wavelength components outputted from the diffraction grating 121 at this time travel in mutually different directions parallel to the y'z' plane.

The optical system 112 condenses the wavelength components outputted from the diffraction grating 121. The wavelength components condensed and outputted by the optical system 112 at this time travel in mutually parallel directions parallel to the y'z' plane. The wavelength components are focused at their respective focus positions which are aligned on a straight line parallel to the y'-axis direction.

Each of the reflecting portions 131-133 has a first reflecting surface capable of facing the optical system 112. The reflecting portion 131 is freely set at and off the focus position of the wavelength component of the wavelength $\lambda 1$ focused by the optical system 112, and, when set at the focus position, it reflects the wavelength component of the wavelength $\lambda 1$ incident from the optical system 112 onto the first reflecting surface, toward the optical system 112. The reflecting portion 132 is freely set at and off the focus position of the wavelength component of the wavelength $\lambda 2$ focused by the optical system 112 and, when set at the focus position, it reflects the wavelength component of the wavelength $\lambda 2$ incident from the optical system 112 onto the first reflecting surface, toward the optical system 112. The reflecting portion 133 is freely set at and off the focus position of the wavelength component of the wavelength $\lambda 3$ focused by the optical system 112 and, when set at the focus position, it reflects the wavelength component of the wavelength $\lambda 3$ incident from the optical system 112 onto the first reflecting surface, toward the optical system 112. A wavelength component reflected by any one of the reflecting portions 131-133 at this time travels in parallel to the y'z' plane or the yz plane via optical system 112, diffraction grating 121, and optical system 111 to be outputted, and then enters the end face of either of the optical fibers 11, 12.

The optical system 113 receives a wavelength component diverging via the focus position as focused by the optical system 112 when one of the reflecting portions 131-133 is set off the focus position, and it collimates and outputs the wavelength component. The wavelength component collimated and outputted by the optical system 113 at this time travels in parallel to the y'z' plane.

The diffraction grating 122 receives the wavelength components collimated by the optical system 113 and outputs the wavelength components into optical paths along the same direction respectively. The grating lines of this diffraction grating 122 extend in the x-axis direction and the wavelength components outputted from the diffraction grating 122 at this time travel in parallel to the z"-axis direction.

The optical system 114 receives the wavelength components outputted from the diffraction grating 122 and injects the wavelength components into the end face of either of the optical fibers 21, 22. The wavelength components outputted from the optical system 114 at this time travel in parallel to the z"-axis direction.

For explaining the configuration of the optical multiplexer/demultiplexer 1, the above described the case wherein the input light was the optical signal emerging from the end face of either of the optical fibers 11, 12. However, this optical multiplexer/demultiplexer 1 is also applicable similarly to a case wherein the input light is an optical signal emerging from the end face of either of the optical fibers 21, 22. In this case, each of the reflecting portions 131-133 has a second reflecting surface capable of facing the optical system 113, and, when set at the focus position, it reflects a wavelength component incident from the optical system 113 onto the second reflecting surface, toward the optical system 113 to inject it into the end face of either of the optical fibers 21, 22.

As shown in FIG. 1(a) and (b), when all the reflecting portions 131-133 are set off the focus positions in the x-axis direction, the optical system 111 collimates the wavelength components of respective wavelengths $\lambda 1$-$\lambda 3$ emerging from the end face of optical fiber 11, the diffraction grating 121 separates them by wavelength, and the optical system 112 condenses them. The optical system 112 focuses the wavelength components at their respective focus positions, and the wavelength components diverge after their focus positions. Then the optical system 113 collimates them, the diffraction grating 122 multiplexes them, and the optical system 114 condenses the multiplexed wavelength components to inject them into the end face of optical fiber 22. Namely, the wavelength components of the respective wavelengths $\lambda 1$-$\lambda 3$ emerging from the end face of optical fiber 11 are incident into the end face of optical fiber 22.

Figure 2:
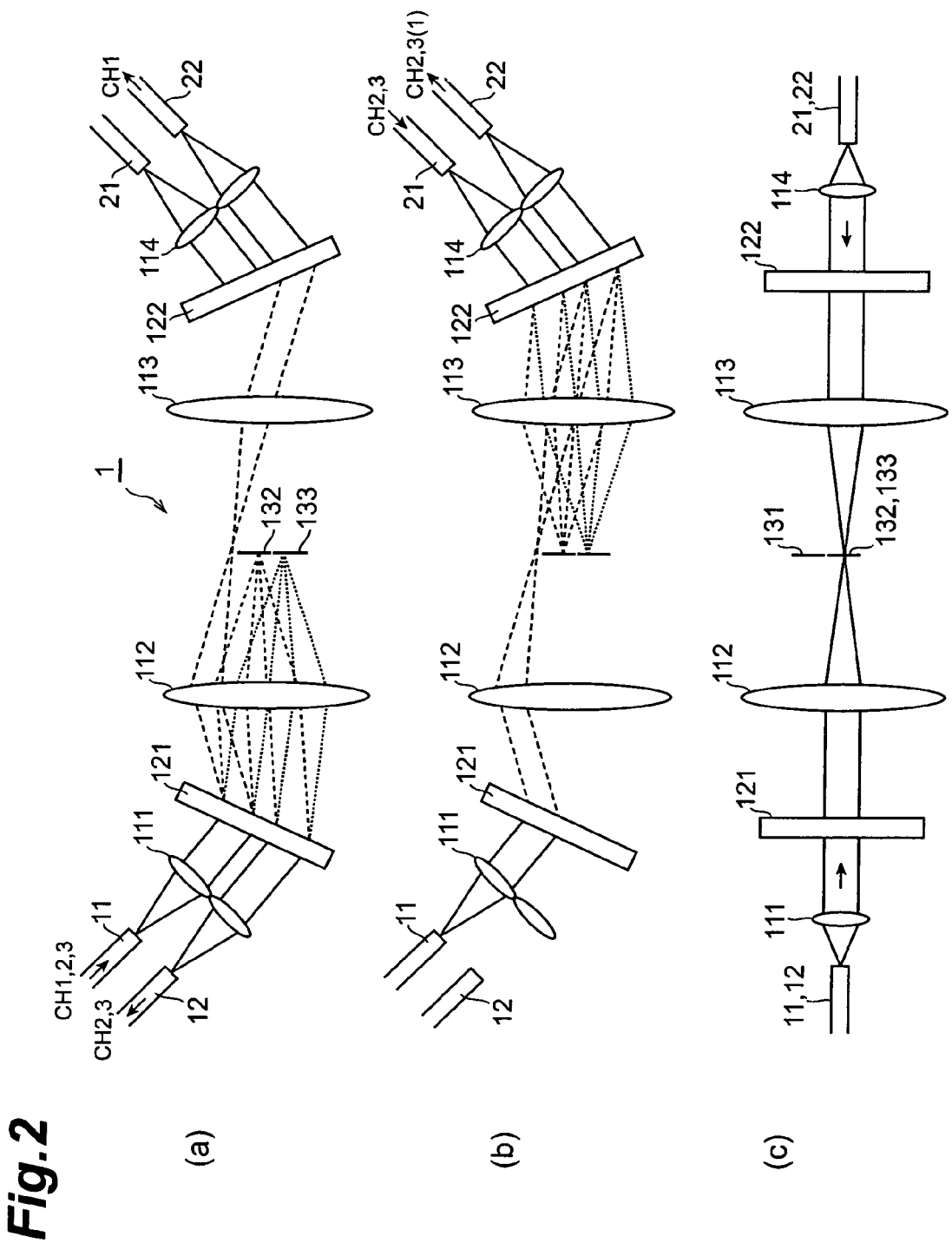
FIG. 2 is an illustration to explain an operation of optical multiplexer/demultiplexer 1 according to the first embodiment.

FIG. 2 is an illustration for explaining an operation of the optical multiplexer/demultiplexer 1 according to the first embodiment. In this figure, the reflecting portion 131 is set off the focus position of the wavelength $\lambda 1$, the reflecting portion 132 at the focus position of the wavelength $\lambda 2$, and the A reflecting portion 133 at the focus position of the wavelength $\lambda 3$. In the same figure (a) and (b) are projections onto the yz(y'z',y"z") plane. In the same figure (c) is a projection onto the xz plane between optical fibers 11, 12 and diffraction grating 121, projection onto the xz' plane between diffraction grating 121 and diffraction grating 122, and projection onto the xz" plane between diffraction grating 122 and optical fibers 21,22.

As shown in FIG. 2(a) and (c), the optical system 111 collimates the wavelength components of the respective wavelengths $\lambda 1$-$\lambda 3$ emerging from the end face of optical fiber 11, the diffraction grating 121 separates them by wavelength, and the optical system 112 condenses them. The wavelength component of the wavelength $\lambda 1$ is condensed by the optical system 112 to be focused at the focus position, and then it diverges after the focus position. The wavelength component of the wavelength $\lambda 1$ is then collimated by the optical system 113, travels via the diffraction grating 122, and is then condensed by the optical system 114 to enter the end face of optical fiber 22. The wavelength components of the wavelengths $\lambda 2$, $\lambda 3$ focused by the optical system 112 are reflected by the first reflecting surfaces of the reflecting portions 132, 133 set at the focus positions, are collimated by the optical system 112, and travel via the diffraction grating 121. They are then condensed by the optical system 111 to enter the end face of optical fiber 12.

As shown in FIG. 2(b) and (c), when the wavelength components of the wavelengths λ2 and λ3 emerge from the end face of optical fiber 21, the optical system 114 collimates these wavelength components of the wavelengths λ2, λ3, the diffraction grating 122 separates them by wavelength, and the optical system 113 condenses them. The wavelength components of the wavelengths λ2, λ3 condensed by the optical system 113 are reflected by the second reflecting surfaces of the reflecting portions 132, 133 set at the focus positions, are collimated by the optical system 113, and travel via the diffraction grating 122. Then they are condensed by the optical system 114 to enter the end face of optical fiber 22.

Namely, the optical signal of wavelengths λ1-λ3 emerging from the end face of optical fiber 11 is separated into the respective wavelength components, among which the wavelength component of the wavelength λ1 is incident to the end face of the optical fiber 22 and the wavelength components of the wavelengths λ2, λ3 to the end face of optical fiber 12. The optical signal of wavelengths λ2, λ3 emerging from the end face of optical fiber 21 is mixed with the optical signal of wavelength λ1 emerging from the end face of optical fiber 11, and the multiplexed wavelength components are incident to the end face of optical fiber 22. In this manner, the optical multiplexer/demultiplexer 1 can act as an ADM (Add-Drop Multiplexer) capable of performing both multiplexing and demultiplexing.

In this optical multiplexer/demultiplexer 1, the area of the first reflecting surfaces of the reflecting portions 131-133 can be made sufficiently larger than the size of focused spots of the wavelength components by the optical system 112, and the area of the second reflecting surfaces of the reflecting portions 131-133 can be made sufficiently larger than the size of focused spots of the wavelength components by the optical system 113. Accordingly, when each of the reflecting portions 131-133 is set at the focus position, the accuracy of the set position does not have to be so high, and it is thus feasible to select the input/output port readily and accurately.

The reflecting surface of each of the reflecting portions 131-133 can deviate from the focus position in the z'-axis direction when each of the reflecting portions 131-133 is set to the focus position. In this case, an optical signal suffers a great loss in the path from the input port to the output port, or the wavelength components can have their respective losses different from each other. If the optical multiplexer/demultiplexer 1 is used in a system in which the aforementioned loss or losses can pose a problem, each of the reflecting portions 131-133 should be arranged to be able to control the position in the z'-axis direction as well.

A desired configuration is such that when the reflecting portions 131-133 are set at the focus positions, the first reflecting surfaces thereof are present at the focus positions by the optical system 112 and the second reflecting surfaces thereof are present at the focus positions by the optical system 113. In that case, however, the focus positions by the optical system 112 are different from the focus positions by the optical system 113, and, with the reflecting portions 131-133 being set off the focus positions, an optical signal focused by the optical system 112 and diverging via the focus position is not collimated well by the optical system 113. Therefore, it is preferable to dispose a transmitting portion adjacent to the reflecting portion, as shown in FIG. 3 or in FIG. 4.

Figure 3:
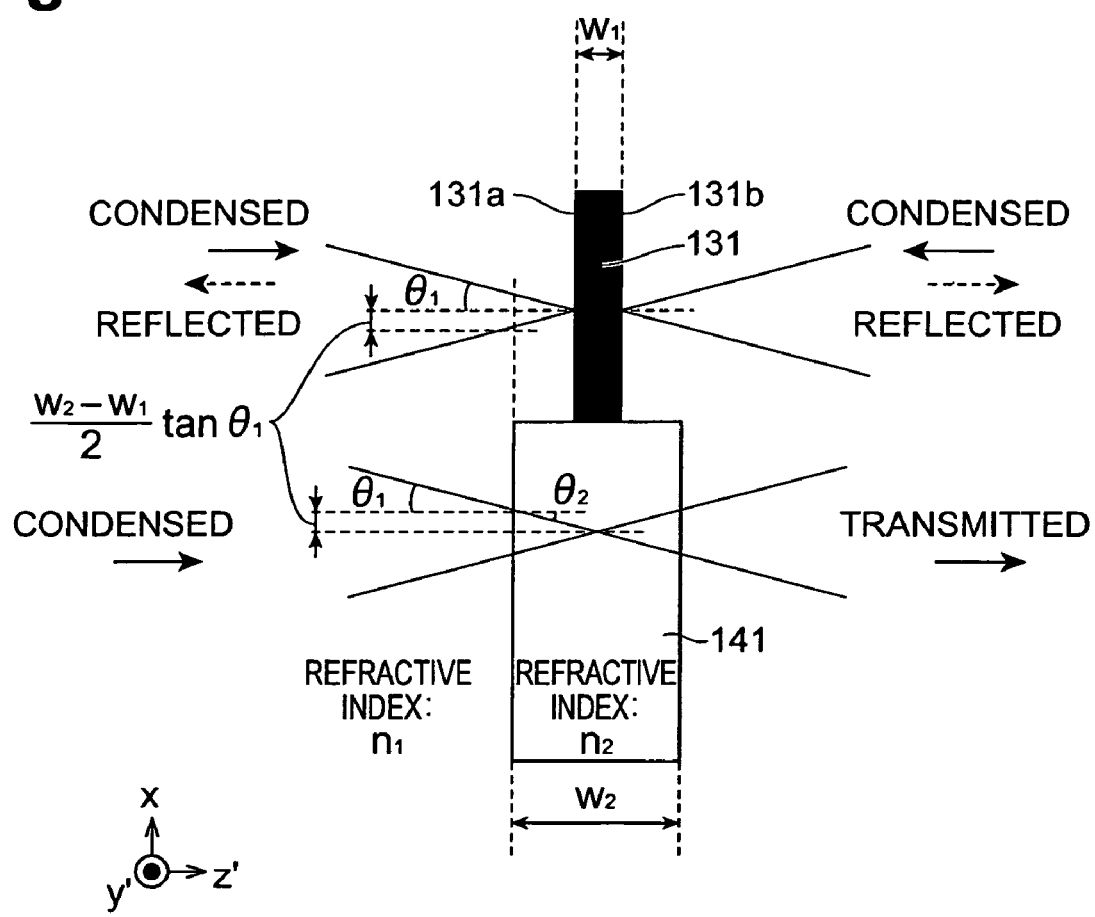
FIG. 3 is an illustration showing a configuration of a first example of reflecting portion 131 and transmitting portion 141.

FIG. 3 is an illustration showing a configuration of a first example of reflecting portion 131 and transmitting portion 141. In the configuration shown in this figure, the transmitting portion 141 is disposed adjacent to the reflecting portion 131, and, when the reflecting portion 131 is located off the focus position, the transmitting portion 141 is set at the focus position. A distance $w_1$ between the first reflecting surface 131a and the second reflecting surface 131b of the reflecting portion 131 in the z'-axis direction is smaller than a thickness $w_2$ of the transmitting portion 141 in the z'-axis direction. The same also applies to each of the reflecting portions 132, 133.

In this configuration, even in the case where with the reflecting portion 131 at the focus position, the first reflecting surface 131a is present at the focus position by the optical system 112 and the second reflecting surface 131b is present at the focus position by the optical system 113, the focus position by the optical system 112 and the focus position by the optical system 113 can agree with each other at a common position inside the transmitting portion 141 with the reflecting portion 131 off the focus position (i.e., with the transmitting portion 141 at the focus position).

As shown in FIG. 3, let us assume that the first reflecting surface 131a of the reflecting portion 131 is normal to principal rays of incident light, the light entrance surface of the transmitting portion 141 is also normal to the principal rays of incident light, an angle of incidence of a certain ray to the reflecting portion 131 or to the transmitting portion 141 is $\theta_1$, and an angle of refraction of the ray in the transmitting portion 141 is $\theta_2$. The refractive index of the medium around the reflecting portion 131 and the transmitting portion 141 (which is normally air) is assumed to be $n_1$ and the refractive index of the medium of the transmitting portion 141 is $n_2$. At this time, the relation of Eq (1) below holds among these parameters.

$$n_1 \sin \theta_1 = n_2 \sin \theta_2 \quad (1)$$

For effective correction for deviation of the focus position, the relation of Eq (2) below needs to hold between the distance $w_1$ between the first reflecting surface 131a and the second reflecting surface 131b, and the thickness $w_2$ of the transmitting portion 141.

$$\tan \theta_2 = [(w_2 - w_1) \tan \theta_1 / 2]/(w_2/2) \quad (2)$$

In the range where the incidence angle $\theta_1$ and the refraction angle $\theta_2$ each are sufficiently small, the relations (3a) and (3b) below hold and thus an approximate expression of Eq (4) below can be derived from the foregoing Eqs (1) and (2).

$$\tan \theta_1 \approx \sin \theta_1 \quad (3a)$$

$$\tan \theta_2 \approx \sin \theta_2 \quad (3b)$$

$$(w_2 - w_1)/w_2 = n_1/n_2 \quad (4)$$

The distance $w_1$ between the first reflecting surface 131a and the second reflecting surface 131b of the reflecting portion 131, the thickness $w_2$ of the transmitting portion 141, and the refractive index $n_2$ of the transmitting portion 141 can be selected so as to satisfy the relation of this Eq (4).

Figure 4:
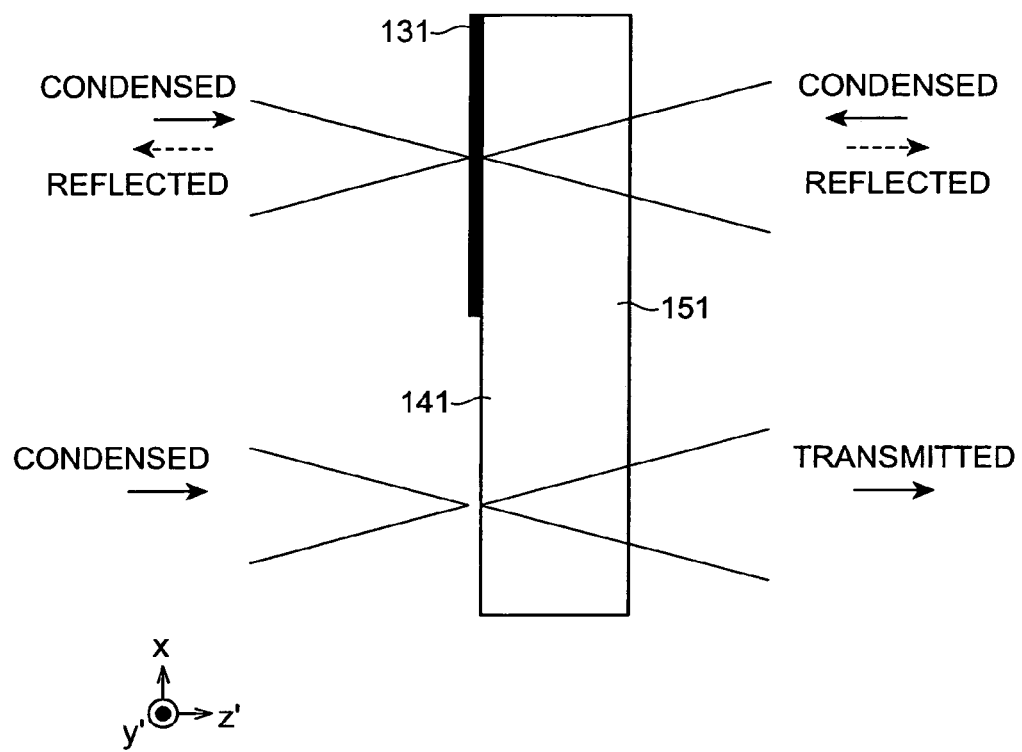
FIG. 4 is an illustration showing a configuration of a second example of reflecting portion 131 and transmitting portion 141.

FIG. 4 is an illustration showing a configuration of a second example of reflecting portion 131 and transmitting portion 141. In the configuration shown in this figure, the reflecting portion 131 is a reflecting film formed on a part of one surface of transparent member 151, and the transmitting portion 141 is a portion without the reflecting film in the transparent member 151. The thickness of the reflecting film 131 is preferably not more than 0.5 µM. The same also applies to each of the reflecting portions 132, 133. The reflecting film as the reflecting portion 131 is made, for example, by evaporation of gold, and the thickness thereof is of sub µm, which causes very little influence on deviation of the focus position. This configuration eliminates a need for selecting the refractive index and thicknesses, so that the configuration is simpler than the configuration shown in FIG. 3.

The reflecting portion 131 and transmitting portion 141 can be made using Si as a base by the MEMS technology. In this case, the transparent member 151 can be Si and a driving section, as well as the reflecting portion 131 and the transmitting portion 141, can also be made by the same semiconductor production process.

The optical multiplexer/demultiplexer disclosed in U.S. Pat. No. 6,661,948 requires optical systems each of which is equivalent to the optical system 111 in the present embodiment to be arranged in series as many as the input/output ports, and the whole of these optical systems must be large. The optical multiplexer/demultiplexer disclosed in U.S. Pat. No. 6,661,948 has the large required effective diameter and numerical aperture of the optical systems equivalent to the optical system 112 in the present embodiment, which requires a large number of lenses in the whole of the optical systems and high processing accuracy of each lens, resulting in high cost In contrast to it, in the optical multiplexer/demultiplexer 1 of the present embodiment the effective diameter and numerical aperture of the optical systems 112, 113 are half and the optical system 112 and the optical system 113 can be of a common configuration, thus achieving the inexpensive structure.

Second Embodiment

Figure 5:
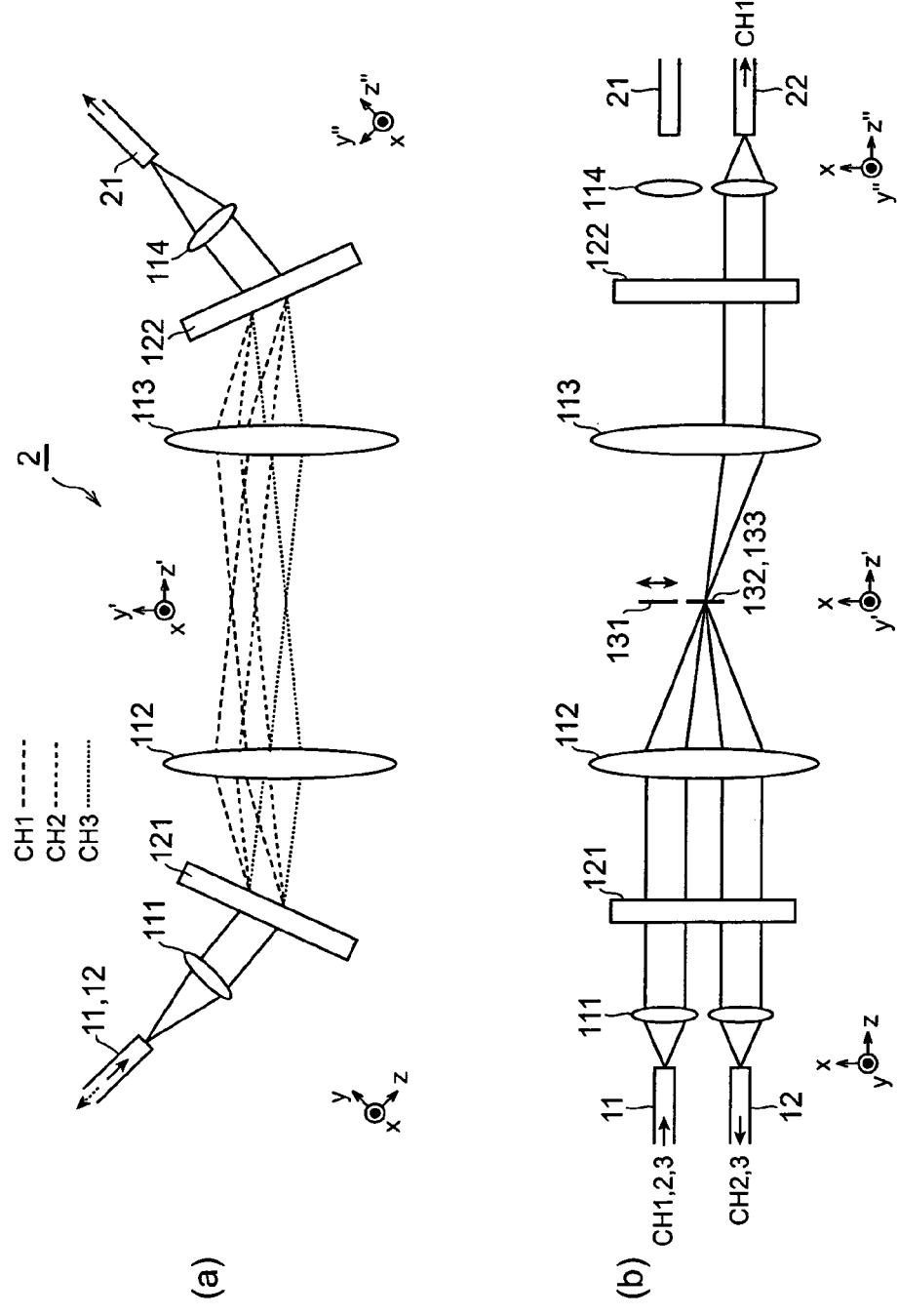
FIG. 5 is a configuration diagram of optical multiplexer/demultiplexer 2 according to the second embodiment.

Next, the second embodiment of the optical multiplexer/demultiplexer according to the present invention will be described. FIG. 5 is a configuration diagram of optical multiplexer/demultiplexer 2 according to the second embodiment. The optical multiplexer/demultiplexer 2 shown in this figure has an optical system 111, a diffraction grating 121, an optical system 112, reflecting portions 131-133, an optical system 113, a diffraction grating 122, and an optical system 114 between optical fibers 11, 12 and optical fibers 21, 22. This optical multiplexer/demultiplexer 2 has input/output ports at positions of end faces of the respective optical fibers 11, 12, 21, and 22, receives light through any one port out of these four ports, and outputs respective wavelength components included in the light, from any port out of the four ports.

An xyz orthogonal coordinate system is defined between optical fibers 11, 12 and diffraction grating 121, while the z-axis is set in parallel to the optical axis of the optical system 111. An xy'z' orthogonal coordinate system is defined between diffraction grating 121 and diffraction grating 122, while the z'-axis is set in parallel to the optical axis of each of the optical systems 112, 113. An xy"z" orthogonal coordinate system is defined between diffraction grating 122 and optical fibers 21, 22, while the z"-axis is set in parallel to the optical axis of the optical system 114. Grating lines in each of the diffraction grating 121 and the diffraction grating 122 extend in the same direction and the x-axis is set in parallel to the direction of the grating lines.

FIG. 5(a) is a projection onto the yz(y'z',y"z") plane. FIG. 5(b) is a projection onto the xz plane between optical fibers 11, 12 and diffraction grating 121, projection onto the xz' plane between diffraction grating 121 and diffraction grating 122, and projection onto the xz" plane between diffraction grating 122 and optical fibers 21, 22.

The optical fibers 11, 12 are juxtaposed in parallel on a common plane parallel to the xz plane. The optical fibers 21, 22 are juxtaposed in parallel on a common plane parallel to the xz" plane. In this respect, the second embodiment is different from the first embodiment.

When an optical signal emerges from the end face of either of the optical fibers 11, 12, the optical system 111 receives the optical signal, collimates it, and outputs the collimated signal. The optical signal collimated and outputted by the optical system 111 at this time travels in parallel to the z-axis direction.

The diffraction grating 121 acts as a wavelength separator, which receives the optical signal collimated by the optical system 111, spatially separates the optical signal into wavelength components of respective wavelengths (three wavelengths λ1-λ3 in the present embodiment), and outputs the wavelength components of the respective wavelengths thus separated, into mutually different paths. The grating lines of this diffraction grating 121 extend in the x-axis direction, and the wavelength components of the respective wavelengths outputted from the diffraction grating 121 at this time travel in mutually different directions parallel to the y'z' plane.

The optical system 112 condenses the wavelength components of the respective wavelengths outputted from the diffraction grating 121. The wavelength components of the respective wavelengths condensed and outputted by the optical system 112 at this time travel in mutually parallel directions parallel to the xz' plane. The focus positions of the wavelength components of the respective wavelengths are aligned on a straight line parallel to the y'-axis direction.

Each of the reflecting portions 131-133 has a first reflecting surface capable of facing the optical system 112. The reflecting portion 131 is freely set at and off the focus position of the wavelength component of the wavelength λ1 focused by the optical system 112, and, when set at the focus position, it reflects the wavelength component of the wavelength λ1 incident from the optical system 112 onto the first reflecting surface, toward the optical system 112. The reflecting portion 132 is freely set at and off the focus position of the wavelength component of the wavelength λ2 focused by the optical system 112 and, when set at the focus position, it reflects the wavelength component of the wavelength λ2 incident from the optical system 112 onto the first reflecting surface, toward the optical system 112. The reflecting portion 133 is freely set at and off the focus position of the wavelength component of the wavelength λ3 focused by the optical system 112 and, when set at the focus position, it reflects the wavelength component of the wavelength λ3 incident from the optical system 112 onto the first reflecting surface, toward the optical system 112. The wavelength components reflected by any one of the reflecting portions 131-133 at this time travel in parallel to the xz' plane or the xz plane via optical system 112, diffraction grating 121, and optical system 111 to be outputted, and then enters the end face of either of the optical fibers 11, 12.

The optical system 113 receives a wavelength component diverging via the focus position as focused by the optical system 112 when one of the reflecting portions 131-133 is set off the focus position, and it collimates and outputs the wavelength component The wavelength component collimated and outputted by the optical system 113 at this time travels in parallel to the y'z' plane.

The diffraction grating 122 receives a wavelength component of each wavelength collimated by the optical system 113 and outputs the wavelength component of each wavelength into an optical path along the same direction. The grating lines of this diffraction grating 122 extend in the x-axis direction and the wavelength component of each wavelength outputted from the diffraction grating 122 at this time travels in parallel to the z"-axis direction.

The optical system 114 receives the wavelength component of each wavelength outputted from the diffraction grating 122 and injects the optical signal into the end face of either of the optical fibers 21, 22. The optical signal of each wavelength outputted from the optical system 114 at this time travels in parallel to the z"-axis direction.

Let us suppose that the reflecting portion 131 is set off the focus position of the wavelength $\lambda 1$, the reflecting portion 132 at the focus position of the wavelength $\lambda 2$, and the reflecting portion 133 at the focus position of the wavelength $\lambda 3$. In this case, the optical system 111 collimates the wavelength components of the respective wavelengths $\lambda 1$-$\lambda 3$ emerging from the end face of the optical fiber 11, the diffraction grating 121 separates them by wavelength, and the optical system 112 condenses them. The wavelength component of the wavelength $\lambda 1$ is focused at the focus position by the optical system 112 and then diverges after the focus position. Then the wavelength component of the wavelength $\lambda 1$ is collimated by the optical system 113, travels via the diffraction grating 122, and is condensed by the optical system 114 to enter the end face of optical fiber 22. The wavelength components of the wavelengths $\lambda 2$, $\lambda 3$ are focused at their respective focus positions by the optical system 112, and are then reflected by the first reflecting surfaces of the reflecting portions 132, 133 set at the focus positions. The reflected wavelength components of the wavelengths $\lambda 2$, $\lambda 3$ are then collimated by the optical system 112, travel via the diffraction grating 121, and are then condensed by the optical system 111 to enter the end face of optical fiber 12.

When the wavelength components of the wavelengths $\lambda 2$, $\lambda 3$ emerge from the end face of the optical fiber 21, the optical system 114 collimates these wavelength components of the wavelengths $\lambda 2$, $\lambda 3$, the diffraction grating 122 separates them by wavelength, and the optical system 113 condenses them. The wavelength components of the wavelengths $\lambda 2$, $\lambda 3$ condensed by the optical system 113 are reflected by the second reflecting surfaces of the reflecting portions 132, 133 set at the focus positions, are then collimated by the optical system 113, travel via the diffraction grating 122, and are condensed by the optical system 114 to enter the end face of optical fiber 22.

Namely, the optical signal of wavelengths $\lambda 1$-$\lambda 3$ emerging from the end face of optical fiber 11 is separated into the wavelength components of the respective wavelengths, among which the wavelength component of the wavelength $\lambda 1$ is incident to the end face of the optical fiber 22 and the wavelength components of the wavelengths $\lambda 2$, $\lambda 3$ to the end face of optical fiber 12. The optical signal of wavelengths $\lambda 2$, $\lambda 3$ emerging from the end face of optical fiber 21 is mixed with the optical signal of wavelength $\lambda 1$ emerging from the end face of optical fiber 11, and the multiplexed wavelength components are incident to the end face of optical fiber 22. In this manner, the optical multiplexer/demultiplexer 2 can act as an ADM capable of performing both multiplexing and demultiplexing.

As described above, this optical multiplexer/demultiplexer 2 is able to operate in the same manner and achieve the same effect as the optical multiplexer/demultiplexer 1 of the aforementioned first embodiment.

Third Embodiment

Figure 6:
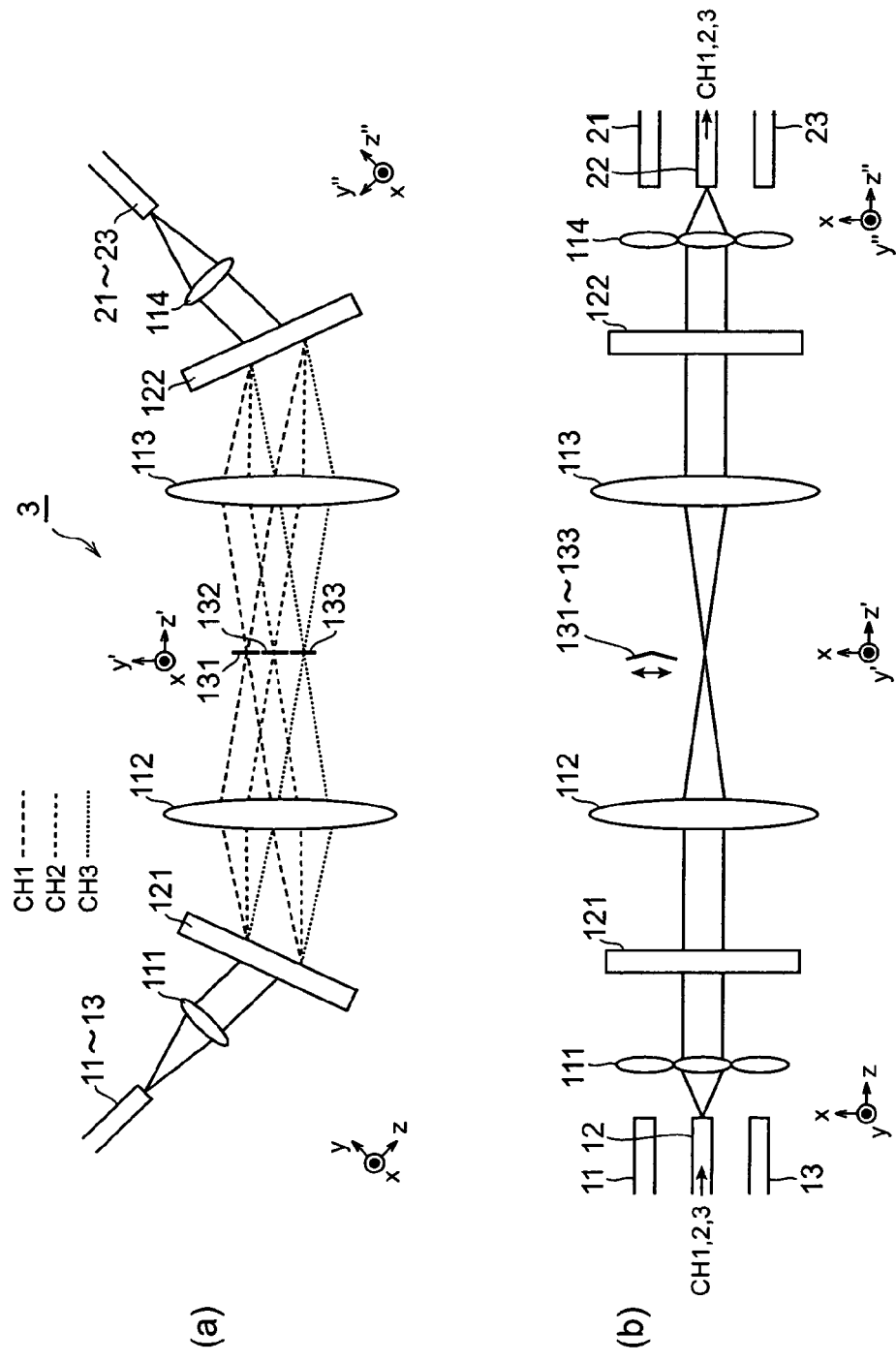
FIG. 6 is a configuration diagram of optical multiplexer/demultiplexer 3 according to the third embodiment.

Next, the third embodiment of the optical multiplexer/demultiplexer according to the present invention will be described. FIG. 6 is a configuration diagram of optical multiplexer/demultiplexer 3 according to the third embodiment. The optical multiplexer/demultiplexer 3 shown in this figure has an optical system 111, a diffraction grating 121, an optical system 112, reflecting portions 131-133, an optical system 113, a diffraction grating 122, and an optical system 114 between optical fibers 11-13 and optical fibers 21-23. This optical multiplexer/demultiplexer 3 has input/output ports at positions of end faces of the respective optical fibers 11-13, 21-23, receives an optical signal through any one port out of these six ports, and outputs a wavelength component of each wavelength included in the optical signal, from any one port of the six ports.

The optical fibers 11-13 are juxtaposed in parallel in this order on a common plane parallel to the xz plane. The optical fibers 21-23 are juxtaposed in parallel in this order on a common plane parallel to the x"z" plane.

The optical multiplexer/demultiplexer 3 of the third embodiment shown in this figure is different from the aforementioned optical multiplexer/demultiplexer 1 of the first embodiment in that the three optical fibers 11-13 are provided on the side of optical system 111, in that the tree optical fibers 21-23 are provided on the side of optical system 114, and in that each of the first reflecting surface and the second-reflecting surface of each reflecting portion 131-133 has two partial reflection portions of planar shape.

One partial reflection portion out of the two partial reflection portions of the first reflecting surface (the reflecting surface capable of facing the optical system 112) of the reflecting portion 131 functions as follows: when the wavelength component of the wavelength $\lambda 1$ emerging from the end face of optical fiber 12 is incident via the optical system 111, diffraction grating 121, and optical system 112 thereonto, it reflects the wavelength component of the wavelength $\lambda 1$ to make the reflected light incident to the end face of optical fiber 11; and the other partial reflection portion functions as follows: when the wavelength component of the wavelength $\lambda 1$ emerging from the end face of optical fiber 12 is incident via the optical system 111, diffraction grating 121, and optical system 112 thereonto, it reflects the wavelength component of the wavelength $\lambda 1$ to make the reflected light incident to the end face of optical fiber 13.

One partial reflection portion out of the two partial reflection portions of the second reflecting surface (the reflecting surface capable of facing the optical system 113) of the reflecting portion 131 functions as follows: when the wavelength component of the wavelength $\lambda 1$ emerging from the end face of optical fiber 22 is incident via the optical system 114, diffraction grating 122, and optical system 113 thereonto, it reflects the wavelength component of the wavelength $\lambda 1$ to make the reflected light incident to the end face of optical fiber 23; and the other partial reflection portion functions as follows: when the wavelength component of the wavelength $\lambda 1$ emerging from the end face of optical fiber 22 is incident via the optical system 114, diffraction grating 122, and optical system 113 thereonto, it reflects the wavelength component of the wavelength $\lambda 1$ to make the reflected light incident to the end face of optical fiber 21.

The two partial reflection portions of each of the first reflecting surface and the second reflecting surface of the reflecting portion 132 function in the same manner as to the wavelength component of the wavelength λ2 as in the case of the above-described reflecting portion 131. The two partial reflection portions of each of the first reflecting surface and the second reflecting surface of the reflecting portion 133 function in the same manner as to the wavelength component of the wavelength λ3 as in the case of the above-described reflecting portion 131.

As shown in FIGS. 6(a) and (b), all the reflecting portions 131-133 are located off the respective focus positions in the x-axis direction, the optical system 111 collimates the wavelength components of the respective wavelengths λ1-λ3 emerging from the end face of optical fiber 12, the diffraction grating 121 separates them by wavelength, and the optical system 112 condenses them. The wavelength components of the respective wavelengths are focused at their respective focus positions by the optical system 112, and then diverge after the focus positions. Then the optical system 113 collimates the wavelength components, the diffraction grating 122 multiplexes them, and the optical system 114 condenses them to make them incident to the end face of optical fiber 22. Namely, the wavelength components of the respective wavelengths λ1-λ3 emerging from the end face of optical fiber 12 are incident to the end face of optical fiber 22.

Figure 7:
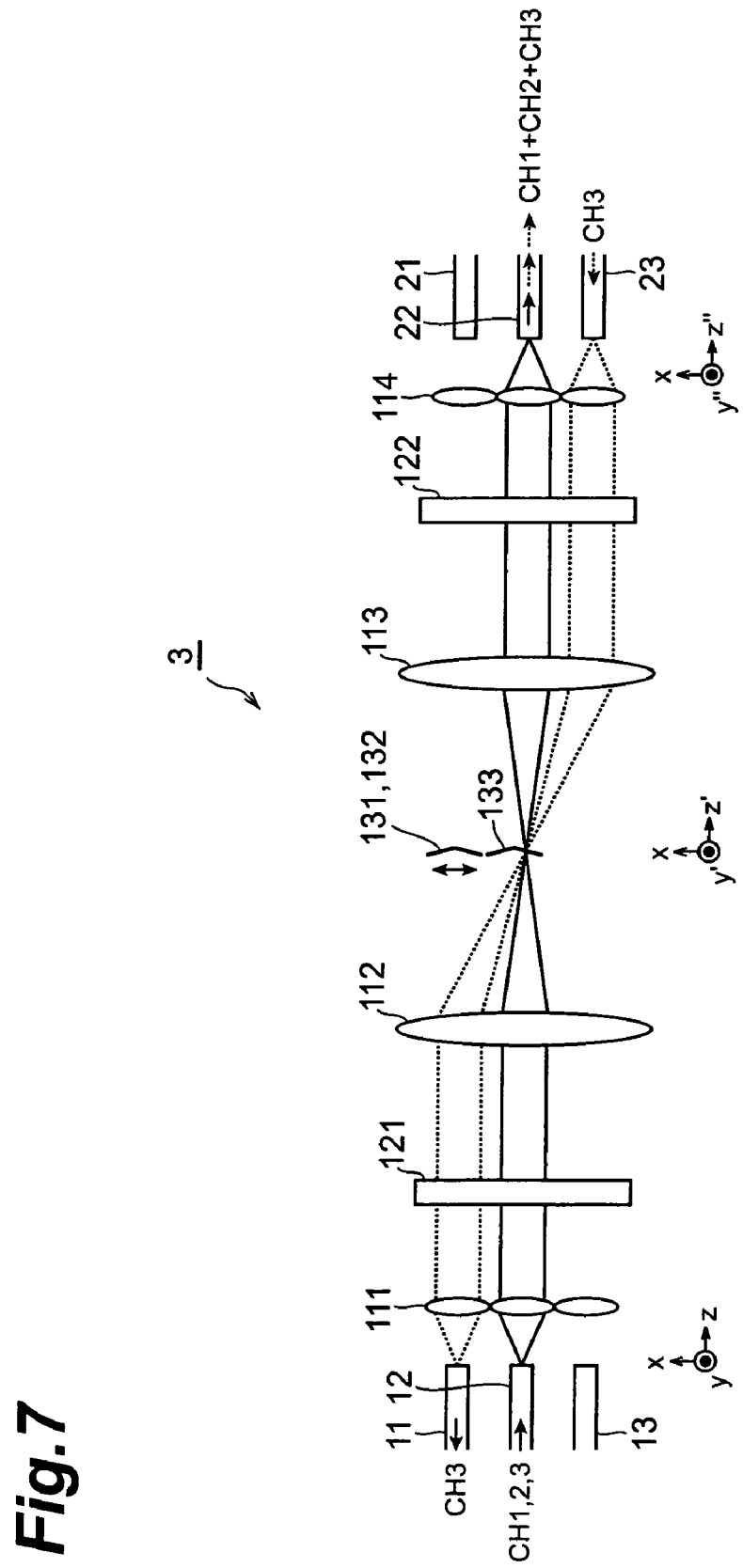
FIG. 7 is an illustration to explain an operation of optical multiplexer/demultiplexer 3 according to the third embodiment.

FIG. 7 is an illustration to explain an operation of optical multiplexer/demultiplexer 3 according to the third embodiment In this figure, the reflecting portions 131, 132 are located off the respective focus positions. In addition, the reflecting portion 133 is set at the focus position, while one partial reflection portion of the first reflecting surface thereof is located at the focus position so as to reflect light coming from the optical fiber 12, toward the optical fiber 11. The same figure is a projection onto the xz plane between optical fibers 11-13 and diffraction grating 121, projection onto the xz' plane between diffraction grating 121 and diffraction grating 122, and projection onto the xz" plane between diffraction grating 122 and optical fibers 21-23.

As shown in FIG. 7, the optical system 111 collimates the wavelength components of the respective wavelengths λ1-λ3 emerging from the end face of optical fiber 12, the diffraction grating 121 separates them by wavelength, and the optical system 112 condenses them. The wavelength components of the wavelengths λ1, λ2 are focused at their respective focus positions by the optical system 112 and diverge after the focus positions. Then the optical system 113 collimates them and the collimated wavelength components travel via the diffraction grating 122, and are condensed by the optical system 114 to enter the end face of optical fiber 22. The wavelength component of the wavelength λ3 focused by the optical system 112 is reflected by one partial reflection portion of the first reflecting surface of the reflecting portion 133 set at the focus position, is collimated by the optical system 112, travels via the diffraction grating 121, and is condensed by the optical system 111 to enter the end face of optical fiber 11.

When the wavelength component of the wavelength λ3 emerges from the end face of the optical fiber 23, this wavelength component of the wavelength λ3 is collimated by the optical system 114, is dizzied by the diffraction grating 122, and is condensed by the optical system 113. The wavelength component of the wavelength λ3 is focused at the focus position by the optical system 113 and is reflected by one partial reflection portion of the second reflecting surface of the reflecting portion 133 set at the focus position. Then the wavelength component of the wavelength λ3 is collimated by the optical system 113, travels via the diffraction grating 122, and is condensed by the optical system 114 to enter the end face of optical fiber 22.

Figure 8:
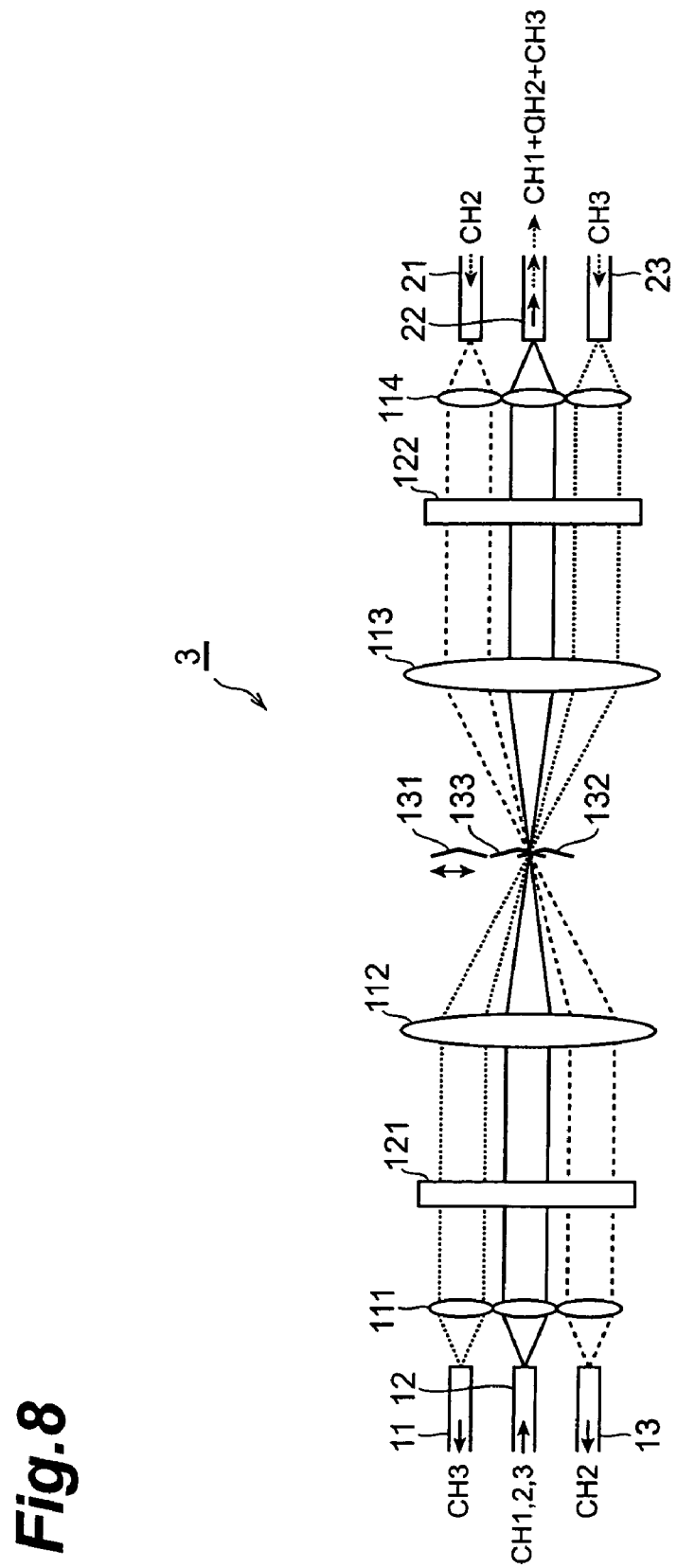
FIG. 8 is an illustration to explain another operation of optical multiplexer/demultiplexer 3 according to the third embodiment.

FIG. 8 is an illustration to explain another operation of the optical multiplexer/demultiplexer 3 according to the third embodiment In this FIG. 8, the reflecting portion 132 is located at the focus position and one partial reflection portion of the first reflecting surface thereof is set at the focus position so as to reflect the wavelength component of the wavelength λ2 coming from the optical fiber 12, toward the optical fiber 13. In this respect the operation is different from that in the aforementioned case shown in FIG. 7.

In this case, the wavelength component of the wavelength λ2 emerging from the end face of optical fiber 12 travels via the optical system 111, diffraction grating 121, and optical system 112 and is reflected by one partial reflection portion of the first reflecting surface of the reflecting portion 132 set at the focus position. The reflected wavelength component travels via the optical system 112, diffraction grating 121, and optical system 111 to enter the end face of optical fiber 13. When the wavelength component of the wavelength λ2 emerges from the end face of optical fiber 21, this wavelength component of the wavelength λ2 travels via the optical system 114, diffraction grating 122, and optical system 113, and is reflected by one partial reflection portion of the second reflecting surface of the reflecting portion 132 set at the focus position. The reflected wavelength component of the wavelength λ2 then travels via the optical system 113, diffraction grating 122, and optical system 114 to enter the end face of optical fiber 22.

In this manner, the optical multiplexer/demultiplexer 3 of the present embodiment also operates as an ADM capable of performing both multiplexing and demultiplexing and the input/output ports are variable.

Fourth Embodiment

Figure 9:
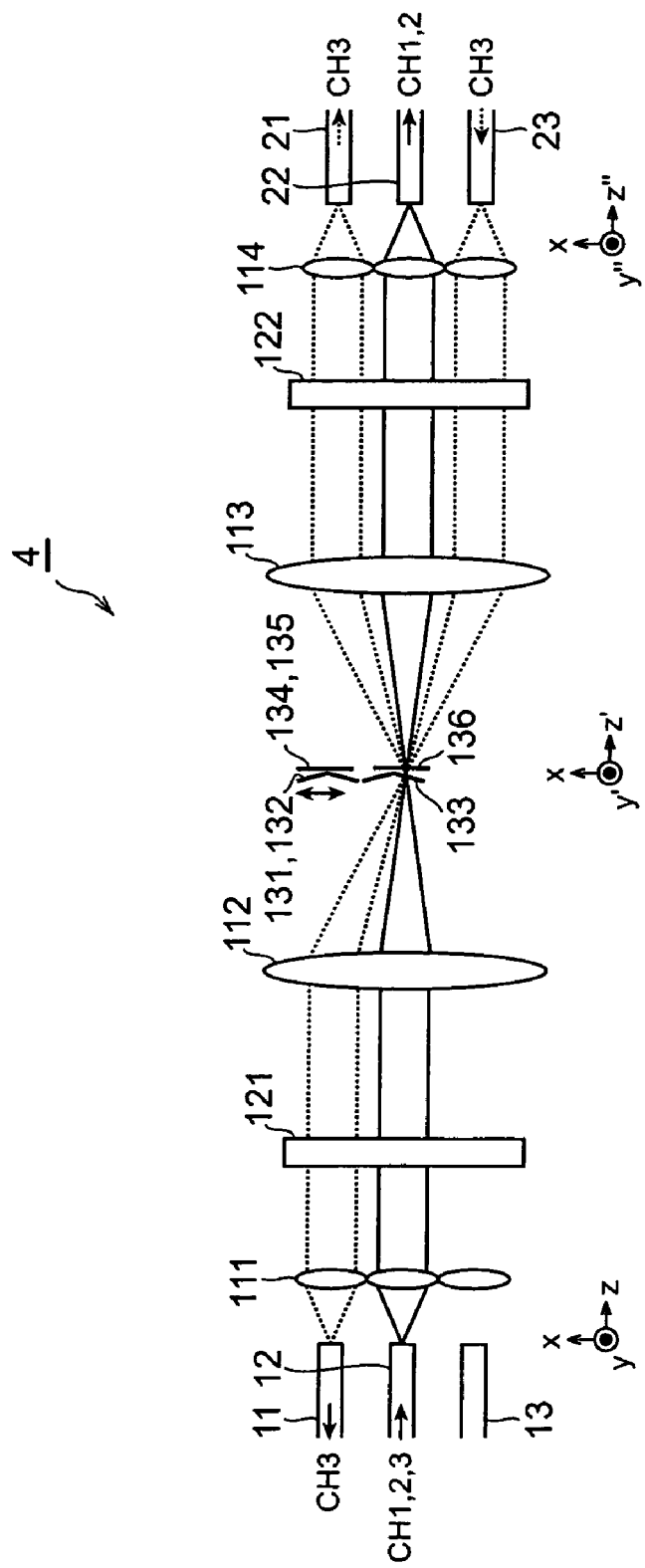
FIG. 9 is a configuration diagram of optical multiplexer/demultiplexer 4 according to the fourth embodiment.

Next, the fourth embodiment of the optical multiplexer/demultiplexer according to the present invention will be described. FIG. 9 is a configuration diagram of optical multiplexer/demultiplexer 4 according to the fourth embodiment The optical multiplexer/demultiplexer 4 of the fourth embodiment shown in this figure is different from the aforementioned optical multiplexer/demultiplexer 3 of the third embodiment in that the optical multiplexer/demultiplexer 4 of the present embodiment further comprises reflecting portions 134-136, in addition to the reflecting portions 131-133.

Each of reflecting portions 131-133 is constructed in the same manner as in the case of the third embodiment so that the reflecting surface capable of facing the optical system 112 has two partial reflection portions of planar shape. In each of reflecting portions 134-136, a reflecting surface capable of facing the optical system 113 is a reflecting portion of planar shape. The six reflecting portions 131-136 each are independently movable.

The reflecting portion 131 reflects the wavelength component of the wavelength λ1 coming from the optical system 112, toward the optical system 112. The reflecting portion 132 reflects the wavelength component of the wavelength λ2 coming from the optical system 112, toward the optical system 112. The reflecting portion 133 reflects the wavelength component of the wavelength λ1 coming from the optical system 112, toward the optical system 112. The reflecting portion 134 reflects the wavelength component of the wavelength λ1 coming from the optical system 113, toward the optical system 113. The reflecting portion 135 reflects the wavelength component of the wavelength λ2 coming from the optical system 113, toward the optical system 113. The reflecting portion 136 reflects the wavelength component of the wavelength λ3 coming from the optical system 113, toward the optical system 113.

It is supposed as shown in this figure that each of the reflecting portions 131, 132, 134, and 135 is set off the focus position, one partial reflection portion of the reflecting surface of the reflecting portion 133 is set at the focus position of the wavelength component of the wavelength λ3, and the reflecting portion 136 is set at the focus position of the wavelength component of the wavelength λ3.

In this setup, the wavelength components of the respective wavelengths λ1-λ3 emerging from the end face of optical fiber 12 are collimated by the optical system 111, are separated by wavelength by the diffraction grating 121, and are condensed by the optical system 112. The wavelength components of the wavelengths λ1, λ2 are focused at their respective focus positions by the optical system 112, and then diverge after the focus positions. Then the wavelength components of the wavelengths λ1, λ2 are collimated by the optical system 113, travel via the diffraction grating 122, and are condensed by the optical system 114 to enter the end face of optical fiber 22. The wavelength component of the wavelength λ3 condensed by the optical system 112 is reflected by one partial reflection portion of the first reflecting surface of the reflecting portion 133 set at the focus position, is collimated by the optical system 112, travels via the diffraction grating 121, and is condensed by the optical system 111 to enter the end face of optical fiber 11.

When the wavelength component of the wavelength λ3 emerges from the end face of optical fiber 23, this wavelength component of the wavelength λ3 is collimated by the optical system 114, is diffracted by the diffraction grating 122, and is then condensed by the optical system 113. The wavelength component of the wavelength λ3 condensed by the optical system 113 is reflected by the reflecting portion 136 set at the focus position, is collimated by the optical system 113, travels via the diffraction grating 122, and is then condensed by the optical system 114 to enter the end face of optical fiber 21.

In this manner, the optical multiplexer/demultiplexer 4 of the present embodiment also operates in the same manner and presents the same effect as the aforementioned optical multiplexer/demultiplexer 3 of the third embodiment The use of his optical multiplexer/demultiplexer 4 permits construction of a more flexible network configuration.

Fifth Embodiment

Figure 10:
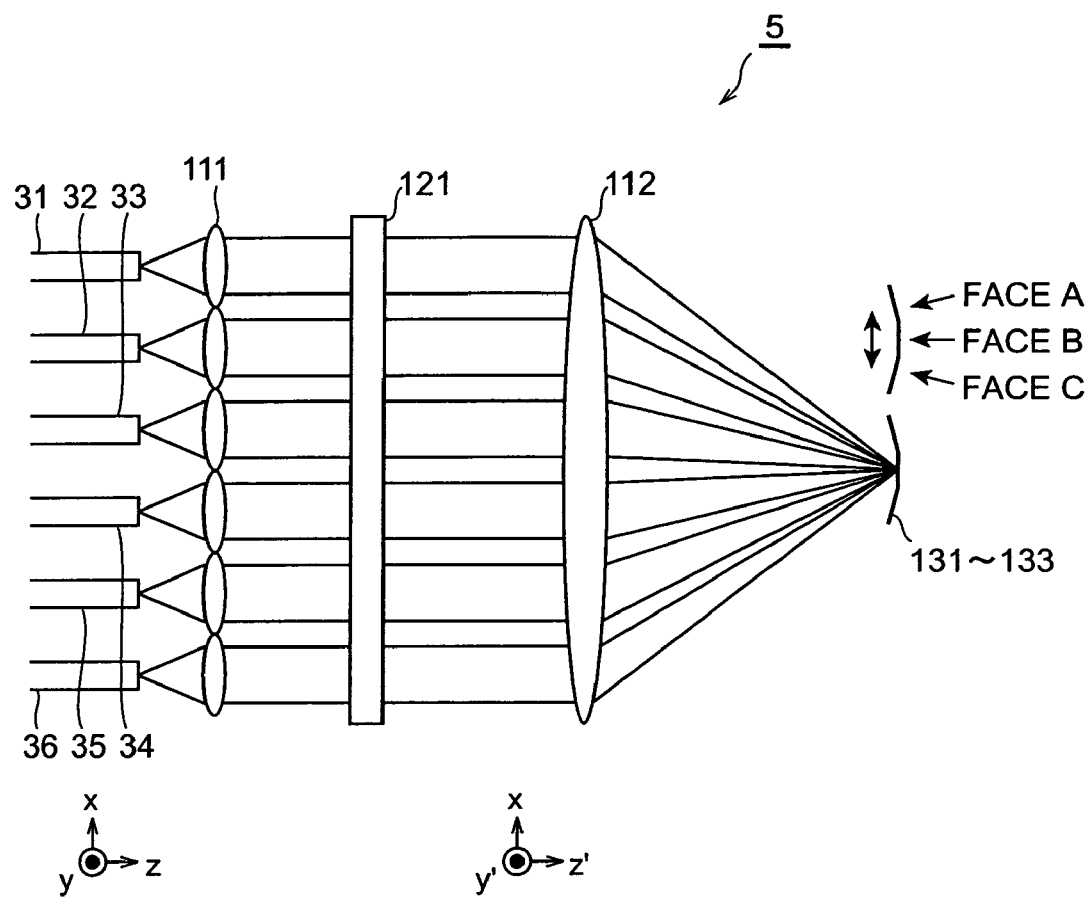
FIG. 10 is a configuration diagram of optical multiplexer/demultiplexer 5 according to the fifth embodiment.

Next, the fifth embodiment of the optical multiplexer/demultiplexer according to the present invention will be described. FIG. 10 is a configuration diagram of optical multiplexer/demultiplexer 5 of the fifth embodiment The optical multiplexer/demultiplexer 5 shown in this figure has optical fibers 31-36, an optical system 111, a diffraction grating 121, an optical system 112, and reflecting portions 131-133. This optical multiplexer/demultiplexer 5 has input/output ports at positions of end faces of the respective optical fibers 31-36, receives an optical signal through any one port out of these six ports, and outputs a wavelength component of each wavelength included in the optical signal, from any one port out of the six ports.

An xyz orthogonal coordinate system is defined between optical fibers 31-36 and diffraction grating 121, while the z-axis is set in parallel to the optical axis of the optical system 111. An xy'z' orthogonal coordinate system is defined between diffraction grating 121 and reflecting portions 131-133, while the z'-axis is set in parallel to the optical axis of the optical system 112. Grating lines in the diffraction grating 121 extend in the same direction, and the x-axis is set in parallel to the direction of the grating lines.

This figure is a projection onto the xz plane between optical fibers 33-36 and diffraction grating 121 and projection onto the xz' plane between diffraction grating 121 and reflecting portions 131-133. The optical fibers 31-36 are juxtaposed in parallel on a common plane parallel to the xz plane.

When an optical signal emerges from the end face of any one of the optical fibers 31-36, the optical system 111 receives the optical signal, collimates it, and outputs the collimated signal. The output signal collimated by the optical system 111 at this time travels in parallel to the z-axis direction.

The faction grating 121 acts as a wavelength separator, which receives the optical signal collimated by the optical system 111, spatially separates the collimated optical signal into wavelength components of respective wavelengths, and outputs the wavelength components of the respective wavelengths thus separated, into mutually different paths. The grating lines of this diffraction grating 121 extend in the x-axis direction and the wavelength components of the respective wavelengths outputted from the diffraction grating 121 at this time travel in mutually different directions parallel to the y'z' plane.

The optical system 112 condenses the wavelength components of the respective wavelengths outputted from the diffraction grating 121. The wavelength components of the respective wavelengths condensed and outputted by the optical system 112 at this time travel in mutually parallel directions parallel to the y'z' plane. The focus positions of the wavelength components of the respective wavelengths are aligned on a straight line parallel to the y'-axis direction.

Each of the reflecting portions 131-133 has three partial reflection portions of planar shape, is located at the focus position of the wavelength component of each wavelength focused by the optical system 112, and is movable in the x-axis direction. Each of the reflecting portions 131-133 receives an optical signal on any one of three partial reflection portions in accordance with the position in the x-axis direction and reflects the optical signal toward the optical system 112 to output it from any one of the six ports.

For example, the wavelength component of the wavelength λ1 emerging from the end face of optical fiber 33 travels via the optical system 111, diffraction grating 121, and optical system 112 and is reflected by a partial reflection surface (face B) of the reflecting portion 131 parallel to the xy' plane, whereupon it travels via the optical system 112, diffraction grating 121, and optical system 111 to enter the end face of optical fiber 34. The wavelength component of the wavelength λ1 emerging from the end face of optical fiber 33 travels via the optical system 111, diffraction grating 121, and optical system 112 and is reflected by a partial reflection surface (face A) of the reflecting portion 131 inclined relative to the xy plane, whereupon it travels via the optical system 112, diffraction grating 121, and optical system 111 to enter the end face of optical fiber 36. The wavelength component of the wavelength λ1 emerging from the end face of optical fiber 33 travels via the optical system 111, diffraction grating 121, and optical system 112 and is reflected by a partial reflection surface (face C) of the reflecting portion 131 inclined relative to the xy plane on the other side, whereupon it travels via the optical system 112, diffraction grating 121, and optical system 111 to enter the end face of optical fiber 32.

In this manner, the optical multiplexer/demultiplexer 5 of the present embodiment is also able to operate in the same manner and present the same effect as the aforementioned optical multiplexer/demultiplexer 4 of the third embodiment The use of this optical multiplexer/demultiplexer 5 permits construction of a more flexible network configuration.

Embodiment of Optical Device

Figure 11:
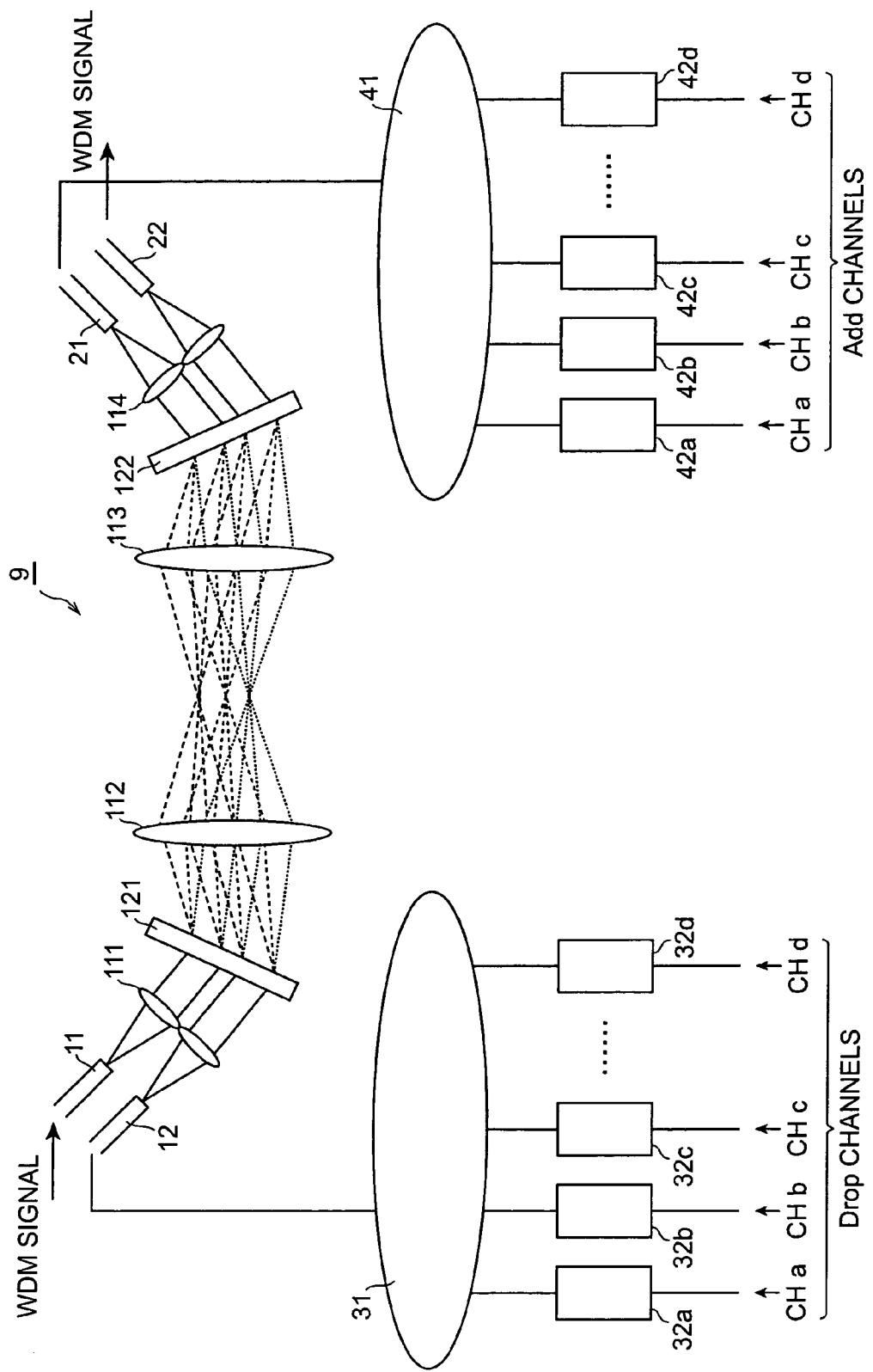
FIG. 11 is a configuration diagram of optical device 9 according to an embodiment of the present invention

Next, an embodiment of the optical device according to the present invention will be described. FIG. 11 is a configuration diagram of optical device 9 according to the present embodiment The optical device 9 shown in this figure comprises the aforementioned optical multiplexer/demultiplexer 1 of the first embodiment and further comprises an optical power separator 31 and wavelength tunable filters 32a-32d connected through optical fiber 12 to one input/output port of the optical multiplexer/demultiplexer 1, and an optical power separator 41 and wavelength tunable filters 42a-42d connected through optical fiber 21 to another input/output port of the optical multiplexer/demultiplexer 1.

In the optical device 9 constructed in this configuration, for example, let us suppose that the reflecting portions 132, 133 in the optical multiplexer/demultiplexer 1 are set at the focus positions. In this setup, when the wavelength components of the wavelengths λ1-λ3 emerge from the end face of optical fiber 11, the wavelength component of the wavelength λ1 among them enters the end face of optical fiber 22, and the remaining wavelength components of the wavelengths λ2, λ3 enter the end face of optical fiber 12. Then the optical power separator 31 separates these wavelength components of the respective wavelengths λ2, λ3 by power, the wavelength tunable filter 32a with the transmission wavelength being set at λ2 outputs the wavelength component of the wavelength λ2, and the wavelength tunable filter 32b with the transmission wavelength being set at λ3 outputs the wavelength component of the wavelength λ3. The optical power separator 41 multiplexes the wavelength component of the wavelength λ2 transmitted by the wavelength tunable filter 42a with the transmission wavelength being set at λ2 and the wavelength component of the wavelength λ3 transmitted by the wavelength tunable filter 42b with the transmission wavelength being set at λ3, and the multiplexed wavelength components are fed to the optical fiber 21 and then enter the end face of optical fiber 22.

Since this optical device 9 is arranged to select a path for a wavelength component of each wavelength, there occurs no loss due to the configuration itself (Modifications)

The present invention can be modified in various ways, without being limited to the above embodiments. For example, each embodiment may also be modified so that the optical fibers are juxtaposed in parallel on a common plane parallel to the xz plane, as in the case of the second embodiment The number of optical fibers (the number of input/output ports) is arbitrary, and the number of reflecting portions and the number of partial reflection portions in each reflecting surface of the reflecting portion can be properly designed according to the number of optical fibers. The optical fibers may be replaced by planar lightguides formed on a substrate. The transmissive diffraction gratings may be replaced by reflective diffraction gratings. The above embodiments described the cases where the optical signal processor was a dispersion compensator, but the present invention is not limited to this.

As the preferred embodiments of the present invention were described above, the present invention enables easy and precise selection of an input/output port.

What is claimed is:

1. An optical multiplexer/demultiplexer for receiving light through any port out of a plurality of ports and for outputting respective wavelength components included in the light, from any port out of the plurality of ports, the optical multiplexer/demultiplexer comprising:

a first optical system for, with input of an optical signal through any one of a first group of ports among the plurality of ports, outputting the optical signal;

a first wavelength separator for receiving the optical signal outputted from the first optical system, for spatially separating the optical signal into respective wavelength components, and for outputting the wavelength components thus separated, into mutually different paths;

a second optical system for condensing the wavelength components outputted from the first wavelength separator;

a reflecting portion having a first reflecting surface capable of facing the second optical system, freely set at and off focus positions of the wavelength components condensed by the second optical system, and, when being set at the focus positions, reflecting the wavelength components incident from the second optical system onto the first reflecting surface, toward the second optical system to output the wavelength component from any one of the first group of ports;

a third optical system for receiving the wavelength components condensed by the second optical system and then diverging via the focus positions with the reflecting portion being set off the focus positions, and for outputting the wavelength components;

a second wavelength separator for receiving the wavelength components outputted from the third optical system and for outputting the wavelength components into paths along an identical direction; and a fourth optical system for receiving the wavelength components outputted from the second wavelength separator and for outputting the wavelength components from any one of a second group of ports among the plurality of ports, wherein the reflecting portion has a second reflecting surface capable of facing the third optical system and, when being set at the focus positions, the reflecting portion reflects light incident from the third optical system onto the second reflecting surface, toward the third optical system to output the wavelength component from any one of the second group of ports, the optical multiplexer/demultiplexer further comprising a transmitting portion adjacent to the reflecting portion, the transmitting portion being set at the focus positions when the reflecting portion is set off the focus positions, wherein a distance between the first reflecting surface and the second reflecting surface of the reflecting portion in an optical-axis direction of each of the second optical system and the third optical system is smaller than a thickness of the transmitting portion in the optical-axis direction.

2. The optical multiplexer/demultiplexer according to claim 1, wherein both or either of the first wavelength separator and the second wavelength separator comprises a diffraction grating.

3. The optical multiplexer/demultiplexer according to claim 1, wherein the first or second reflecting surface is a reflecting film formed on a part of one surface of a transparent member, and the transmitting portion is a portion without the reflecting film in the transparent member.

4. The optical multiplexer/demultiplexer according to claim 3, wherein a thickness of the reflecting film is not more than 0.5 μm.

5. An optical multiplexer/demultiplexer for receiving light through any port out of a plurality of ports and for outputting respective wavelength components included in the light, from any port out of the plurality of ports, the optical multiplexer/demultiplexer comprising:

a first optical system for, with input of an optical signal through any one of a first group of ports among the plurality of ports, outputting the optical signal;

a first wavelength separator for receiving the optical signal outputted from the first optical system, for spatially separating the optical signal into respective wavelength components, and for outputting the wavelength components thus separated, into mutually different paths;

a second optical system for condensing the wavelength components outputted from the first wavelength separator;

a reflecting portion having a first reflecting surface capable of facing the second optical system, freely set at and off focus positions of the wavelength components condensed by the second optical system, and, when being set at the focus positions, reflecting the wavelength components incident from the second optical system onto the first reflecting surface, toward the second optical system to output the wavelength component from any one of the first group of ports;

a third optical system for receiving the wavelength components condensed by the second optical system and then diverging via the focus positions with the reflecting portion being set off the focus positions, and for outputting the wavelength components;

a second wavelength separator for receiving the wavelength components outputted from the third optical system and for outputting the wavelength components into paths along an identical direction; and a fourth optical system for receiving the wavelength components outputted from the second wavelength separator and for outputting the wavelength components from any one of a second group of ports among the plurality of ports, wherein the first reflecting surface of the reflecting portion has a plurality of partial reflection portions, and a normal to any one of the partial reflection portions is not parallel to a normal of at least one of the other partial reflection portions.

6. An optical multiplexer/demultiplexer for receiving light through any port out of a plurality of ports and for outputting respective wavelength components included in the light, from any port out of the plurality of ports, the optical multiplexer/demultiplexer comprising:

a first optical system for, with input of an optical signal through any one of a first group of ports among the plurality of ports, outputting the optical signal;

a first wavelength separator for receiving the optical signal outputted from the first optical system, for spatially separating the optical signal into respective wavelength components, and for outputting the wavelength components thus separated, into mutually different paths;

a second optical system for condensing the wavelength components outputted from the first wavelength separator;

a reflecting portion having a first reflecting surface capable of facing the second optical system, freely set at and off focus positions of the wavelength components condensed by the second optical system, and, when being set at the focus positions, reflecting the wavelength components incident from the second optical system onto the first reflecting surface, toward the second optical system to output the wavelength component from any one of the first group of ports;

a third optical system for receiving the wavelength components condensed by the second optical system and then diverging via the focus positions with the reflecting portion being set off the focus positions, and for outputting the wavelength components;

a second wavelength separator for receiving the wavelength components outputted from the third optical system and for outputting the wavelength components into paths along an identical direction; and a fourth optical system for receiving the wavelength components outputted from the second wavelength separator and for outputting the wavelength components from any one of a second group of ports among the plurality of ports, wherein the reflecting portion has a second reflecting surface capable of facing the third optical system and, when being set at the focus positions, the reflecting portion reflects light incident from the third optical system onto the second reflecting surface, toward the third optical system to output the wavelength component from any one of the second group of ports, and the second reflecting surface of the reflecting portion has a plurality of partial reflection portions, and a normal to any one of the partial reflection portions is not parallel to a normal of at least one of the other partial reflection portions.

7. An optical device comprising:

an optical multiplexer/demultiplexer for receiving light through any port out of a plurality of ports and for outputting respective wavelength components included in the light, from any port out of the plurality of ports, the optical multiplexer/demultiplexer comprising:

a first optical system for, with input of an optical signal through any one of a first group of ports among the plurality of ports, outputting the optical signal;

a first wavelength separator for receiving the optical signal outputted from the first optical system, for spatially separating the optical signal into respective wavelength components, and for outputting the wavelength components thus separated, into mutually different paths;

a second optical system for condensing the wavelength components outputted from the first wavelength separator;

a reflecting portion having a first reflecting surface capable of facing the second optical system, freely set at and off focus positions of the wavelength components condensed by the second optical system, and, when being set at the focus positions, reflecting the wavelength components incident from the second optical system onto the first reflecting surface, toward the second optical system to output the wavelength component from any one of the first group of ports;

a third optical system for receiving the wavelength components condensed by the second optical system and then diverging via the focus positions with the reflecting portion being set off the focus positions, and for outputting the wavelength components;

a second wavelength separator for receiving the wavelength components outputted from the third optical system and for outputting the wavelength components into paths along an identical direction; and a fourth optical system for receiving the wavelength components outputted from the second wavelength separator and for outputting the wavelength components from any one of a second group of ports among the plurality of ports;

a first optical power separator and a first wavelength tunable filter connected to any one of the first group of ports of the optical multiplexer/demultiplexer; and a second optical power separator and a second wavelength tunable filter connected to any one of the second group of ports of the optical multiplexer/demultiplexer.

8. An optical transmission system comprising the optical device as defined in claim 7, the optical transmission system transmitting a multi-wavelength optical signal and processing the multi-wavelength optical signal by means of the optical device.

* * * * *